(12) United States Patent
Yang et al.

(10) Patent No.: US 7,378,484 B2
(45) Date of Patent: May 27, 2008

(54) TOUGHNESS-INCREASED PHENOLIC RESIN AND PREPARATION THEREOF

(75) Inventors: Jeng-Chang Yang, Longtan Township, Taoyuan County (TW); Chen-Chi Martin Ma, Hsinchu (TW); Hon-Bin Chen, Longtan Township, Taoyuan County (TW); Chin-Yih Chen, Longtan Township, Taoyuan County (TW)

(73) Assignee: Chung Shan Institute of Science and Technology, Taoyuan County (TW)

( * ) Notice: Subject to any disclaimer, the term of this patent is extended or adjusted under 35 U.S.C. 154(b) by 483 days.

(21) Appl. No.: 11/094,176

(22) Filed: Mar. 31, 2005

(65) Prior Publication Data

US 2006/0223971 A1    Oct. 5, 2006

(51) Int. Cl.
 *C08G 8/02*  (2006.01)
 *C08G 8/00*  (2006.01)

(52) U.S. Cl. .................. 528/137; 528/125; 525/487
(58) Field of Classification Search ............. 528/129, 528/137, 125; 525/487
See application file for complete search history.

(56) References Cited

U.S. PATENT DOCUMENTS 6,372,351 B1 *  4/2002  Takemiya et al. ........... 428/416

\* cited by examiner

*Primary Examiner*—Duc Truong
(74) *Attorney, Agent, or Firm*—Rabin & Berdo, P.C.

(57) ABSTRACT

A phenolic resin that increases its toughness by polydimethylsiloxane and a process of preparing the same is provided. Polydimethylsiloxane is added as a coupling agent in a γ-glycidoxypropyltrimethoxysilane-modified phenolic resin to improve the compatibility between polydimethylsiloxane and the phenolic resin. Then, tetraethoxysilane is added to conduct hydrolysis condensation and obtain tougher and thermally stable phenolic resin.

15 Claims, 1 Drawing Sheet

TOUGHNESS-INCREASED PHENOLIC RESIN AND PREPARATION THEREOF

FIELD OF THE INVENTION

The invention generally relates to a phenolic resin, and more particularly to a phenolic resin with toughness enhanced by polydimethyl siloxane (PDMS).

DESCRIPTION OF THE RELATED ART

Phenolic resin is a synthetic resin that was the earliest to be applied in industry, about 130 years ago. Due to thermal stability and electric insulation, the fireproofing and flame-resistant properties of phenolic resin are superior to other resins, and phenolic resin has been widely used as a fireproofing/flame-resistant material. However, the phenolic group and methylene on the phenolic resin provide high antioxidization capability so that weather resistance, thermally oxidizing resistance and chemical resistance thereof are not good. In addition, its high coefficient of thermal expansion, poor processibility, high brittleness, low toughness, and poor mechanic property limit the application of phenolic resin.

Therefore, studies on phenolic resin composite material have been made. For example, fiber strengthened phenolic resin substrate has improved performance that is comparable to steel, flameristant material and other non-iron alloys. However, traditional composite materials cannot fulfill the requirements as the industry develops. Hybrid materials including organic and inorganic substances have attracted much attention as replacement of the composite material. Inorganic ceramic material has high strength and thermal resistance, and organic polymeric material has good toughness and processibility; the combination of these two materials offers complementary performance. Therefore, organic/inorganic hybrid material has the following advantages: high rigidity, high yield strength, increased break strength and glass transition temperature.

In preparation of the organic/inorganic hybrid material, blending processes, sol-gel processes and intercalation processes are commonly used. Recently, the sol-gel process has been used to embed organic polymers into an inorganic material to increase the ratio of organic with respect to inorganic. Such a process offers several advantages as follows:

1. The combination of organic and inorganic materials synthesizes the desirable properties of those materials. An interlacing network structure over molecule level layers increases compatibility between these materials and thus prevents phase delamination.

2. The hybrid material is transparent so it can be used in optical applications and it improves problems caused by porous inorganic glass.

So far, TEOS (tetraethoxysilane) has been successfully introduced into phenolic resin by the sol-gel process to obtain an organic/inorganic nano hybrid phenolic resin. Such a modified resin has better fireproofing and thermal properties.

However, such a modified resin is still quite brittle. Therefore, toughness-increased phenolic resin that can be used in broad applications is needed.

SUMMARY OF THE INVENTION

Accordingly, one object of the invention is to provide a phenolic resin that increases its toughness by polydimethylsiloxane, and a process of preparing the same. Polydimethylsiloxane is used in the sol-gel process to increase the toughness of a γ-glycidoxypropyltrimethoxysilane-modified phenolic resin. With the addition of a coupling agent, the compatibility between polydimethylsiloxane and modified phenolic resin is improved.

In order to achieve the above and other objectives, the phenolic resin that increases its toughness by polydimethylsiloxane according to the invention is obtained by hydrolysis condensation of a first precursor, a second precursor and tetraethoxysilane. The first precursor includes a henolic resin and γ-glycidoxypropyltrimethoxysilane. The hydroxyl group of the phenolic resin is grafted on the epoxy group of γ-glycidoxypropyltrimethoxysilane. The second precursor includes a coupling agent and polydimethylsiloxane. The hydroxy group of the polydimethylsiloxane is grafted on a first terminal of the coupling agent, while a second terminal of the coupling agent is a branched siloxane moiety.

Furthermore, the process of preparing the phenolic resin that increases its toughness by polydimethylsiloxane according to the invention includes the following steps. First, the open ring reaction of phenolic resin is performed by usingγ-glycidoxypropyltrimethoxysilane to form the first precursor. Then, the coupling agent reacts with the polydimethylsiloxane to form the second precursor. The first precursor, second precursor and tetraethoxysilane are used for hydrolysis condensation to form the phenolic resin that increases its toughness by polydimethylsiloxane.

The foregoing is a summary and shall not be construed to limit the scope of the claims. The operations and structures disclosed herein may be implemented in a number of ways, and changes and modifications may be made without departing from the invention and its broader aspects. Other aspects, inventive features, and advantages of the invention, as defined solely by the claims, are described in the non-limiting detailed description set forth below.

DETAILED DESCRIPTION OF THE EMBODIMENT(S)

Figure 1:
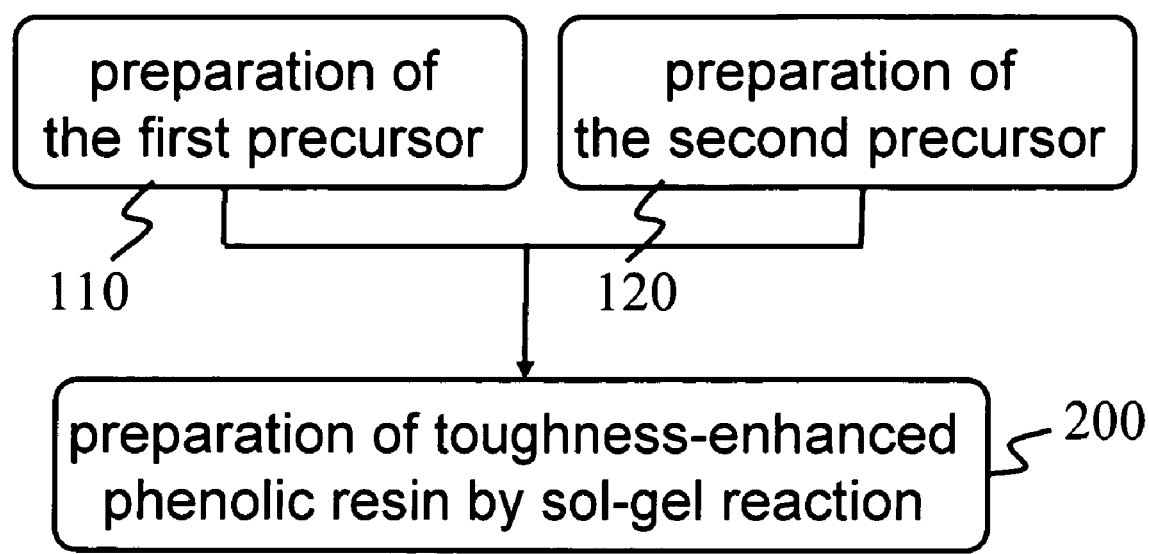
FIG. 1 shows a flowchart of preparation of a phenolic resin that increases its toughness by polydimethylsiloxane.

Flexible silicon-based resin is introduced in brittle phenolic resin to increase the toughness of the phenolic resin. In order to overcome the non-compatibility between the silicon-based resin and the phenolic resin, three coupling agents are used to modify the silicon-based resin. In this embodiment of the invention, 3-glycidoxypropyltrimethoxysilane, 3-isocyanato-propyltriethoxysiliane and tetraethoxysilane are used as coupling agents. The modified silicon-based resin is added in 3-glycidoxypropyltrimethyoxysilane modified phenolic resin. The tetraethoxysilane is introduced into the phenolic resin to improve the thermal property and toughness of the phenolic resin.

In improving the toughness of the phenolic resin, not only the compatibility between the silicon-based resin and phenolic resin, but also the flame-resistant application of the phenolic resin should be considered. In view of compatibility, all the following conditions should be met: the glass transition temperature (Tg) (less than 20° C.) of a toughness increasing agent must be lower than a test temperature so that good impact strength at room temperature is ensured; the toughness increasing agent must form a dispersed second phase in a composite material; and there is good adhesion between two phases.

Preferably, hydroxyl-terminated polydimethylsiloxane with a molecular weight of 400-700 g/mole is used as the toughness increasing agent. Hydroxyl-terminated polydimethylsiloxane offers, in addition to improved toughness, good processability without any cracks at 350-400° C. With consideration of both compatibility and increasing toughness, hydroxyl-terminated polydimethylsiloxane works well.

Referring to FIG. 1, the process of preparing the phenolic resin that increases its toughness by hydroxyl-terminated polydimethylsiloxane according to the invention includes the following steps. First, the open ring reaction of the phenolic resin is performed by using γ-glycidoxypropyltnrnethoxysilane to form the first precursor (step 110). Then, the coupling agent reacts with polydimethylsiloxane to form the second precursor (step 120). The first precursor, the second precursor and tetraethoxysilane are mixed to conduct a sol-gel reaction to obtain the phenolic resin that increases its toughness by polydimethylsiloxane (step 200).

Subsequently, examples below illustrate the preparation of the phenolic resin that increases its toughness by polydimethylsiloxane according to the invention.

EXAMPLE 1

1. Preparation of Precursor

Step 110: Preparation of the First Precursor

Novolac resin is dissolved in tetrahydrofurfan with 50% solid content. γ-glycidoxypropyltrimethoxysilane at 10 phr (parts per hundred ratio) based on 100 parts of phenolic resin is slowly added in the novolac resin solution to initiate the open ring reaction of the epoxy group of γ-glycidoxypropyltrimethoxysilane and the hydroxyl group of the phenolic resin at a reaction temperature lower than 70° C. with stirring by magnetic stones. After reaction for 20-24 hours, the first precursor is obtained.

Step 120: Preparation of the Second Precursor

γ-glycidoxypropyltrimethoxysilane and polydimethylsiloxane at the ratio of 2.1:1 are added in 1-7 phr (based on 100 parts of the phenolic resin) polydimethylsiloxane, in which polydimethylsiloxane is the quantity limiting agent. The ring of the epoxy group of γ-glycidoxypropyltrimethoxysilane is opened to react with hydroxyl groups at both terminals of polydimethylsiloxane at a temperature lower than 80° C. by stirring with magnetic stones for 20-24 hours to form the second precursor.

2. Preparation of Toughness-Enhanced Phenolic Resin by a Sol-Gel Reaction (Step 200)

20 wt % tetraethoxysilane, de-ionized water and co-solvent THF are mixed. The second precursor of about 1-9 phr is added. Then, three drops of catalyst HCl is added with stirring by magnetic stones for about 20 minutes. A great deal of heat comes out of the solution and a clear transparent liquid is formed, which is referred to as "solution A."

A hardening agent hexamethylene tetramine of 10 phr (based on 100 parts of phenolic resin) is added in the first precursor. THF of 40% based on the first precursor is added while stirring until the hardening agent and the first precursor are completely dissolved. After water and HCl of a proper amount are added, alkoxy moiety of the phenolic resin is hydrolyzed. The solution A is mixed with the first precursor to conduct the hydrolysis condensation to obtain the phenolic resin that increases its toughness according to the invention.

EXAMPLE 2

The preparation of the first precursor in this example is the same as Example 1 (step 110), except that 3-isocyanato-propyltriethoxysilane is used as the coupling agent to modify the polydimethylsiloxane.

The preparation of the second precursor includes the following procedures (step 120). 3-isocyanato-propyltriethoxysilane is added in about 1-9 phr (based 100 parts of phenolic resin) at the ratio of 3-isocyanato-propyltriethoxysilane:polydimethylsiloxane=2.1:1, in which polydimethylsiloxane is the quantity limiting agent. The NCO group of 3-isocyanato-propyltriethoxysilane reacts with hydroxyl groups at both terminals of polydimethylsiloxane at a temperature lower than 80° C. by stirring with magnetic stones for about 3 hours to form the second precursor.

The obtained first and second precursors are mixed with tetraethoxysilane to conduct the sol-gel reaction to obtain the phenolic resin that increases its toughness by polydimethylsiloxane.

EXAMPLE 3

The preparation of the first precursor in this example is the same as Example 1 (step 110), except that tetraethoxysilane is used as the coupling agent to modify polydimethylsiloxane.

The preparation of the second precursor includes the following procedures (step 120). Tetraethoxysilane is added in about 1-7 phr (based 100 parts of phenolic resin) at the ratio of tetraethoxysilane:polydimethylsiloxane=2.1:1, in which polydimethylsiloxane is the quantity limiting agent. Tetraethoxysilane and polydimethylsiloxane are added in $CH_3COOK$ solution to react tetraethoxysilane with hydroxyl groups at both terminals of polydimethylsiloxane at a temperature lower than 80° C. by stirring with magnetic stones for 24 hours to form the second precursor.

The obtained first and second precursors are mixed with tetraethoxysilane to conduct the sol-gel reaction to obtain the phenolic resin that increases its toughness by polydimethylsiloxane.

Furthermore, the physical and chemical properties of the toughness enhanced phenolic resin obtained above have been inspected. It was found that non-modified polydimethylsiloxane has long chains with embedded terminal groups that hinder interaction with the phenolic resin. For example, a hydrogen chain and covalent chain result in seriously physical breakage during drying. The coupling agent modified polydimethylsiloxane has a flat aspect and is not easily breakable. A small amount (less than 10 phr) of modified polydimethylsiloxane is in the phenolic resin. An si solid NMR graph shows the structure formed by the condensation of the modified polydimethylsiloxane, and the phenolic resin is based on Q3 and Q4, which indicates the physical configuration of an Si—O—Si network.

In terms of thermal property, after polydimethylsiloxane is added, the crack temperature lowers, especially when γ-glycidoxypropyltrimethoxysilane and 3-isocyanato-propyltriethoxysilane are used as the coupling agents for modifying the polydimethylsiloxane. The crack temperature is higher than non-modified phenolic resin by about 10-30° C., i.e. the crack temperature is about 390-410° C.

In terms of flammability, it was found that L.O.I values of modified and non-modified phenolic resins are similar, about 35-39, and values obtained from U.L. tests also reach the permissive value of 94V-0.

In terms of mechanical properties, γ-glycidoxypropyltrimethoxysilane is the best coupling agent to increase the toughness of the phenolic resin among these three coupling agents. The modified phenolic resin using γ-glycidoxypropyltrimethoxysilane has its impact strength increased by 15.8%, tensile strength increased by 10.2%, and tensile modulus increased by 35.9% compared to non-modified resin. The modified phenolic resin using tetraethoxysilane has its impact strength increased by 6.9%, tensile strength decreased by 10.5%, and tensile modulus decreased by 18.7% compared to non-modified resin. The modified phenolic resin using 3-isocyanato-propyltriethoxysilane has its impact strength decreased by 3.8%, tensile strength decreased by 6.2%, and tensile modulus increased by 15.4% compared to non-modified resin.

As described above, the phenolic resin that increases its toughness by polydimethylsiloxane according to the invention improves the compatibility between polydimethylsiloxane and the phenolic resin and significantly increases the toughness of polydimethylsiloxane modified phenolic resin. The modified phenolic resin has both increases toughness and flame-resistant properties.

What is claimed is:

1. A phenolic resin which has an increased toughness due to including therein a polydimethylsiloxane, and which is a hydrolysis condensation product of a first precursor, a second precursor and tetraethoxysilane,
   wherein the first precursor includes a phenolic resin and γ-glycidoxypropyltrimethoxysilane in which hydroxyl groups of the phenolic resin are grafted onto an epoxy group of the γ-glycidoxypropyltrimethoxysilane, and
   wherein the second precursor includes a coupling agent and an hydroxyl-terminated polydimethylsiloxane in which hydroxyl groups of the polydimethylsiloxane are grafted at a first terminal of the coupling agent and a second terminal of the coupling agent has a branched siloxane structure.

2. The phenolic resin of claim 1, wherein the phenolic resin is a novolac resin.

3. The phenolic resin of claim 1, wherein the coupling agent is γ-glycidoxypropyltrimethoxysilane.

4. The phenolic resin of claim 1, wherein the coupling agent is 3-isocyanato-propyltriethoxysilane.

5. The phenolic resin of claim 1, wherein the coupling agent is tetraethoxysilane.

6. The phenolic resin of claim 5, wherein the second precursor is obtained by using potassium acetate in ethanol solution as the coupling agent and a catalyst used for polydimethylsiloxane.

7. The phenolic resin of claim 1, wherein the polydimethylsiloxane has a weight average molecular weight of 400-700.

8. A process of preparing a phenolic resin having an increased toughness due to including therein a polydimethylsiloxane, the process comprising the steps of:
   performing a ring opening reaction on a novolac resin by using γ-glycidoxypropyltrimethoxysilane to form a first precursor;
   reacting a coupling agent with an hydroxyl-terminated polydimethylsiloxane to form a second precursor; and
   using the first precursor, the second precursor and tetraethoxysilane for hydrolysis condensation to form the phenolic resin having an increased toughness due to including therein a polydimethylsiloxane.

9. The process of claim 8, wherein the phenolic resin is a novolic resin.

10. The process of claim 8, wherein the molar ratio of the coupling agent and polydimethylsiloxane is 2.1:1.

11. The process of claim 8, wherein the coupling agent is γ-glycidoxypropyltrimethoxysilane.

12. The process of claim 8, wherein the coupling agent is 3-isocyanato-propyltriethoxysilane.

13. The process of claim 8, wherein the coupling agent is tetraethoxysilane.

14. The process of claim 13, wherein during reacting to farm the second precursor a catalyst is used which is potassium acetate in ethanol solution.

15. The process of claim 8, wherein the polydimethylsiloxane has a weight average molecular weight of 400-700.

* * * * *